UNITED STATES PATENT OFFICE.

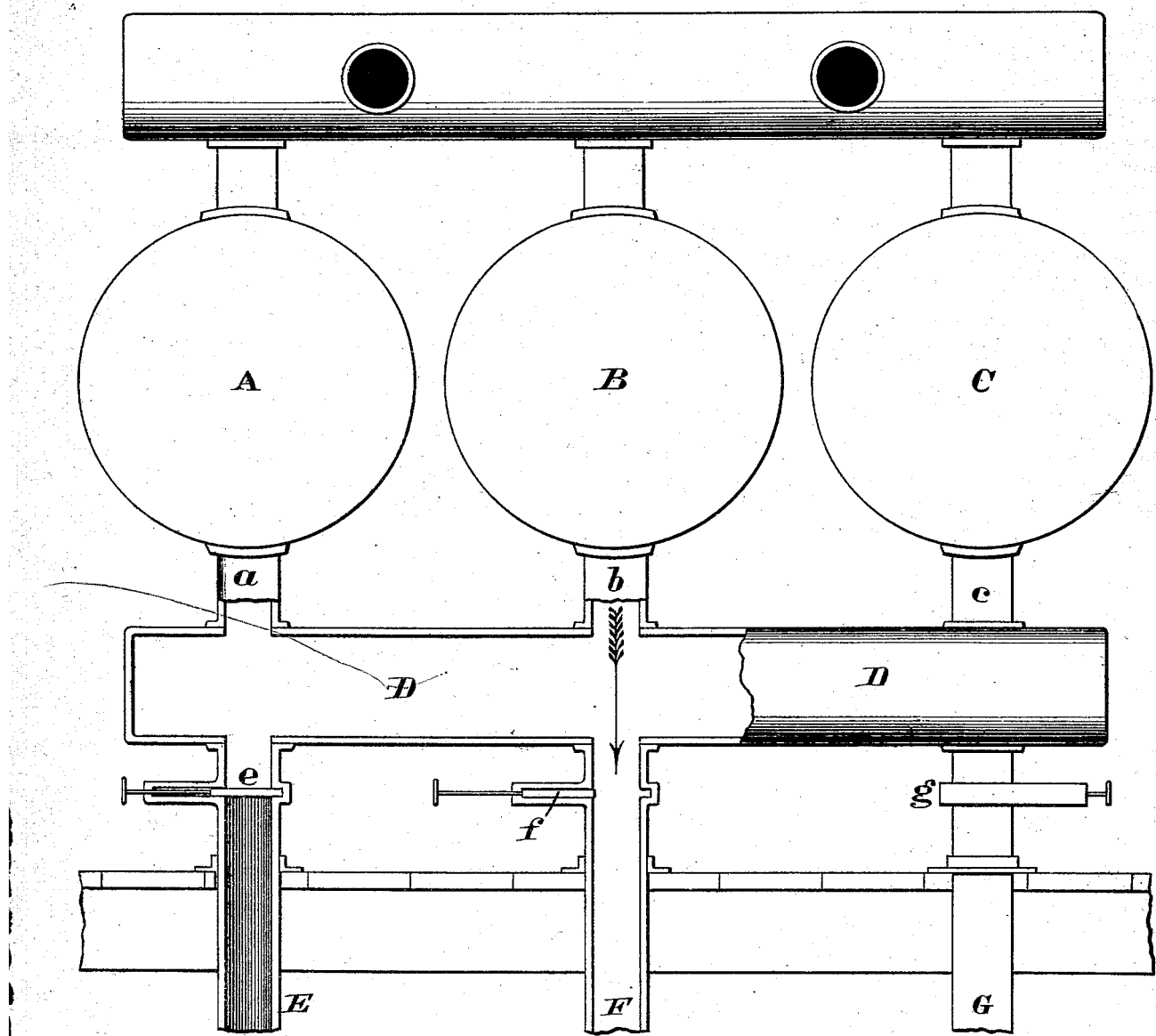

NEHEMIAH SHERMAN, OF CINCINNATI, OHIO.

IMPROVEMENT IN BLOW-OFF PIPES FOR STEAM-BOILERS.

Specification forming part of Letters Patent No. 117,571, dated August 1, 1871.

*To all whom it may concern:*

Be it known that I, NEHEMIAH SHERMAN, of Cincinnati, Hamilton county, Ohio, have invented a new and useful Arrangement of Blow-off Pipes for Steam-Boilers, of which the following is a specification:

Blow-pipes as ordinarily arranged—usually but one pipe for a tier of boilers, and that pipe situated at the end of the mud-drum—have not such direct communication with the boiler as to effectually discharge the mud and sediment therefrom. This defective action is due to the sinuous course or channel which the water is compelled to take, and which, by checking its impetus and creating eddies, acts to precipitate the mud and other impurities mechanically suspended in the water, and to cause them to lodge and be detained within the corners and interstices of the boiler and drum.

In order to remedy this defect I provide as many blow-off pipes as there are boilers, and so locate them underneath the mud-drum as to be directly in line with the leg or connecting-pipe that unites the boiler to the mud-drum.

In the accompanying drawing, a tier of boilers and a mud-drum with blow-off pipes, located in accordance with my plan, are shown by vertical section.

A B C is a series or tier of boilers, connected, by customary legs, $a$ $b$ $c$, with a mud-drum, D. Attached to the under side of this drum, and communicating with it, is a series of blow-off pipes, E F G, one for each boiler. Each pipe has a suitable valve or gate, $e$ $f$ $g$, which, being opened, permits a direct stream of water to issue vertically downward from its respective boiler, and in so doing effectually dislodges and discharges all the mud and other matters in mechanical suspension in the water.

I claim as new and of my invention—

The arrangement of blow-off pipes for steam-boilers, herein made known.

In testimony of which invention I hereunto set my hand.

NEHEMIAH SHERMAN.

Witnesses:
GEO. H. KNIGHT,
JAMES H. LAYMAN.